(12) United States Patent
Capron et al.

(10) Patent No.: US 8,269,978 B2
(45) Date of Patent: Sep. 18, 2012

(54) IMAGING WITH NONDEGENERATE FREQUENCY-ENTANGLED PHOTONS

(75) Inventors: Barbara A. Capron, Sammamish, WA (US); Claudio G. Parazzoli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1312 days.

(21) Appl. No.: 11/938,492

(22) Filed: Nov. 12, 2007

(65) Prior Publication Data

US 2010/0278373 A1 Nov. 4, 2010

(51) Int. Cl.
*G01B 9/02* (2006.01)
(52) U.S. Cl. .......................................... 356/484
(58) Field of Classification Search ............... 356/484, 356/450
See application file for complete search history.

(56) References Cited

U.S. PATENT DOCUMENTS

| | | | | |
|---|---|---|---|---|
| 7,292,342 | B2 * | 11/2007 | Zaugg | 356/451 |
| 7,362,420 | B2 * | 4/2008 | Zaugg | 356/5.01 |
| 7,375,802 | B2 * | 5/2008 | Allen et al. | 356/4.01 |
| 7,812,303 | B2 * | 10/2010 | Meyers et al. | 250/208.1 |
| 2005/0006593 | A1 | 1/2005 | Kastella et al. | |
| 2005/0206904 | A1 * | 9/2005 | Zaugg | 356/451 |
| 2009/0194702 | A1 * | 8/2009 | Meyers et al. | 250/393 |

FOREIGN PATENT DOCUMENTS

WO 2005/092071 10/2005

OTHER PUBLICATIONS

Hoger F Hofmann and Takafumi Ono, "high photon entanglement in the interfence of spontaneously downconverted photon pairs with coherent laser light", Sep. 2007, American Physical Society, vol. 76, p. 031806.*
Jeffrey H. Shapiro, "Semiclassical versus Quantum Imaging in Standoff Sensing," Center for Extreme Quantum Information Theory, Research Laboratory of Electronics at MIT, Oct. 1, 2007, XP002517264.
Jeffrey H. Shapiro, "Ghost Imaging: From Quantum to Classical to Computational," Center for Extreme Quantum Information Theory, Research Laboratory of Electronics at MIT, Nov. 17, 2008, pp. 1-29, XP002517265.
Lugiato et al., "Quantum imaging;" Journal of Optics B: Quantum and Semiclassical Optics, Institute of Physics Publishing, Bristol, GB, vol. 4, No. 3, Jun. 1, 2002, pp. S176-S183, XP020081868, ISSN: 1464-4266.
Pittman et al., "Two photon geometric optics" The American Physical Society, vol. 53, No. 4, 1996, pp. 2808 and 2813-14.
de Dood et al. "Nonlinear Photonic Crystals as a Source of Entangled Photons," PhysRevLett.93.050405, 2004).

(Continued)

*Primary Examiner* — Tarifur Chowdhury
*Assistant Examiner* — Jonathan Hansen

(57) ABSTRACT

An object that might be at least partially obscured is imaged. Frequency-entangled photons are generated. The frequency-entangled photons include photons having first and second frequencies. Those photons having the first frequency can pass through the obscuration and illuminate the object. Photons scattered by the object and those photons having the second frequency are used to form an image by considering coincidences in time of arrival.

23 Claims, 4 Drawing Sheets

OTHER PUBLICATIONS

Sharping et al, "Quantum-correlated twin photons from microstructure fiber," Optics Express 3086, vol. 12, No. 14, 2004.

Hayat et. al., "High-Rate Entanglement Source via Two-Photon Emission from Semiconductor Quantum Wells" arXiv quant-ph/0612124, 2006.

Stevenson et. al., "A semiconductor source of triggered entangled photon pairs" Nature, vol. 439, pp. 179-182, 2006.

Pelton et al., "Bright, single-spatial-mode source of frequency non-degenerate, polarization-entangled photon pairs using periodically poled KTP" Optical Express 3573, vol. 12, No. 15, 2004.

* cited by examiner

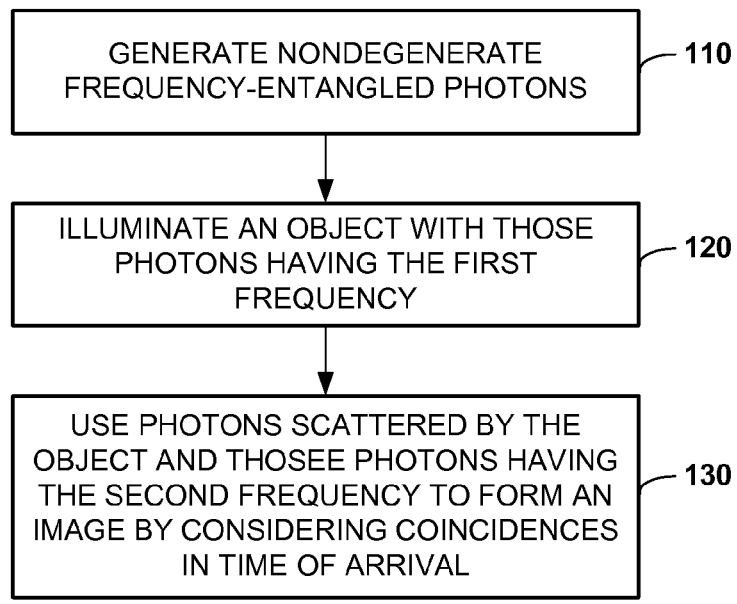
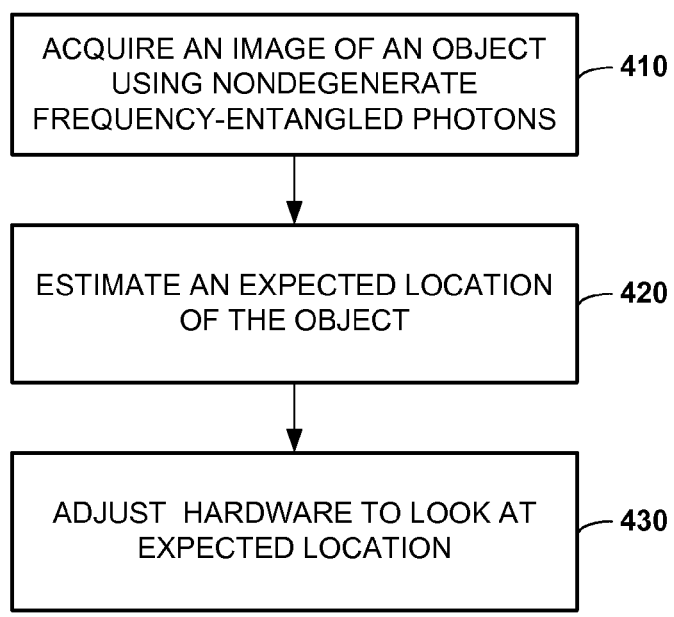

IMAGING WITH NONDEGENERATE FREQUENCY-ENTANGLED PHOTONS

BACKGROUND

Quantum entanglement is a quantum mechanical phenomenon in which the quantum properties of two or more objects are described with reference to each other, even though the individual objects may be spatially separated. Two photons, A and B, are said to be entangled and form a bi-photon system when, if one property of the photon A is known, then the corresponding property of photon B is also known. For example, if two photons are prepared in an entangled state, and one of the photons is observed to have a specific polarization, then the other photon will have a known polarization.

SUMMARY

According to an aspect of the present invention, an object that might be at least partially obscured is imaged. Frequency-entangled photons are generated. The frequency-entangled photons include photons having first and second frequencies. Those photons having the first frequency pass through the obscuration and illuminate the object. Photons scattered by the object and those photons having the second frequency are used to form an image by considering coincidences in time of arrival.

BRIEF DESCRIPTION OF THE DRAWINGS

FIG. 1 is an illustration of a method in accordance with an embodiment of the present invention.

FIG. 4 is an illustration of a method of tracking an object in accordance with an embodiment of the present invention.

DETAILED DESCRIPTION

Reference is made to FIG. 1, which illustrates a method of imaging an object with frequency-entangled photons. The object might be at least partially obscured. That is, the object might be obscured partially, or it might be obscured fully. As used herein, the "obscuration" refers to one or more obscurants that at least partially obscure the object.

Frequency entanglement refers to a quantum mechanical phenomenon in which two photons have different wavelengths that are correlated. The photons can be physically separated, yet still preserve the entanglement of the frequencies. For example, if the total energy of a bi-photon system is $\epsilon_{12}=\epsilon_1+\epsilon_2$, then the knowledge of $\epsilon_1$ also immediately gives $\epsilon_2$ and vice versa, and the energy $\epsilon$ of any photon is inversely proportional to its wavelength. The photons may be degenerate, that is have equal frequencies ($\epsilon_1=\epsilon_2$,) or they may be nondegenerate, that is $\epsilon_1 \neq \epsilon_2$.

At block 110, nondegenerate frequency-entangled photons are generated. The frequency-entangled photons include photons having first and second frequencies. The first frequency is selected so photons can pass through the obscuration. Although the photons having the first frequency will be able to pass through the obscuration, they will not form an image of the object with adequate resolution.

Typically, the second frequency will be substantially higher than the first frequency. The second frequency corresponds to an imaging resolution.

At block 120, the object is illuminated with the photons having the first frequency. The obscuration does not prevent the object from being illuminated, since the photons having the first frequency pass through the obscuration. The object scatters the photons.

At block 130, photons scattered by the object and the photons having the second frequency are used to form an image. Photon entanglement is used to extend imaging capability beyond the traditionally observed limits for classical light. Due to entanglement, the image may have a higher resolution than it would have had the image been formed only by the photons having the first frequency.

When forming the image, coincidences in time of arrival are considered. Within a time window, certain properties (e.g., coherence) of the photons scattered by the object remain correlated with the photons having the second frequency. Outside of this time window, the properties become uncorrelated. Correlated photons having the second frequency are used to increase the image resolution.

Figure 2:
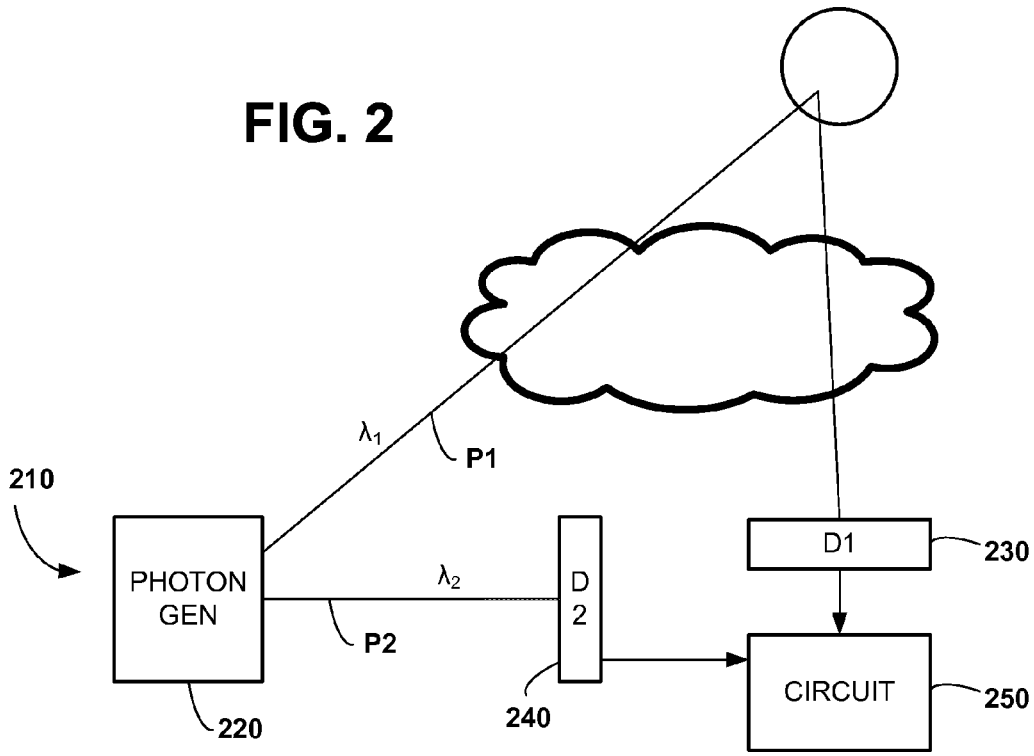
FIG. 2 is an illustration of a system in accordance with an embodiment of the present invention.

Reference is made to FIG. 2, which illustrates a system 210 for imaging an object that is at least partially obscured. The obscuration is represented schematically by a cloud. However, the obscuration is not limited to a visible mass of suspended particles. As will be seen later, the obscuration is application-dependent.

The system 210 includes a generator 220 of nondegenerate frequency-entangled photons having first and second frequencies. The frequency-entangled photons may be generated by parametric down conversion (PDC), or some other method. Other methods include, but are not limited to, four-wave mixing in photonic crystals (see, for example, de Dood et al. "Nonlinear Photonic Crystals as a Source of Entangled Photons," PhysRevLett. 93.050405, 2004); use of microstructured fibers to generate highly confined electromagnetic fields (see, for example, Sharping et al, "Quantum-correlated twin photons from microstructure fiber," Optics Express 3086, vol. 12, no. 14, 2004); semiconductor quantum wells (see, for example, Hayat et. al., "High-Rate Entanglement Source via Two-Photon Emission from Semiconductor Quantum Wells" arXiv quant-ph/0612124, 2006); quantum dot structures (see, for example, Stevenson et. al., "A semiconductor source of triggered entangled photon pairs" Nature, vol. 439, pp. 179-82, 2006); and bright sources of dichromatic photons (see, for example, Pelton et al., "Bright, single-spatial-mode source of frequency non-degenerate, polarization-entangled photon pairs using periodically poled KTP" Optical Express 3573, vol. 12, no. 15, 2004).

The photon generator 220 sends the photons having the first frequency down a first path P1, and the photons having the second frequency down a second path P2. The photons sent down the first path P1 pass through the obscuration. If the object lies in the first path P1, the object will be illuminated by the photons having the first frequency. If so illuminated, the object will scatter the photons having the first frequency.

The second path is not limited to any length, any environment, etc., so long as the second path does not disturb the entanglement. For example, the second path P2 may be long and unobscured, it may be short and in a controlled environment, etc., provided that the entanglement is not disturbed.

The system 210 includes first and second detectors 230 and 240 that are capable of counting individual photons. A detector 230 or 240 may be a single detector across which the photons are scanned, a linear array across which photons are scanned, or a 2-D array that does not require scanning. Each detector 230 and 240 senses an electromagnetic field and outputs phase and amplitude of the sensed field.

The second detector 240 lies in the second path P2 and detects photons sent down the second path P2. The second detector 240 outputs phase and amplitude of an electromagnetic field formed by the photons having the second frequency.

The first detector 230 is positioned to detect the photons scattered by the object. The first detector 230 collects all possible photons and outputs phase and amplitude of an electromagnetic field formed by the scattered photons.

The system 210 further includes a circuit 250, responsive to the first and second detectors 230 and 240, for forming an image. The image may be formed in the correlation plane as determined by the imaging properties of the setup. The "setup" refers to distances between the objects, detectors and optics. The imaging properties depend on these distances.

An image can be formed in a correlation plane by performing a second order correlation of the photons' complex electric fields detected by the first and second detectors. Coincidence counts are mapped as a function of the x-y coordinates of the second detector 240. Coincidence counting measures the time average of the product of the complex electric field measured at the first detector 230 times the complex electric field measured at the second detector 240. The complex electric field can be described in terms of phase and amplitude. An example of computing the second order correlation is described in a paper by Pittman et al., "Two photon geometric optics," The American Physical Society, vol. 53, no. 4, 1996, pp. 2808 and 2813-14.

According to the paper by Pittman et al., coincidence counting rate may be calculated as a function of the transverse spatial parameters involved, and this function may be minimized to obtain the sharpest image. However, the "sharpest" image is not always required. While the sharpest images might be preferred for some embodiments of the present invention, slightly blurry or out of focus images might be suitable for other embodiments.

The length of the time window during which the photons remain correlated will be on the order of less than 10 ns. The time window length will depend on pump beam qualities such as bandwidth.

In some embodiments, the first detector 230 may include a "bucket detector." A bucket detector refers to a multimode detector where all the modes propagating through an object are measured jointly. The bucket detector detects the presence, but not the location, of a photon. A bucket detector collects all the photons scattered by the object and acts like a time gate for a second detector 240. A time gate allows the second detector 240 to know when to begin its observation and start counting coincidences.

In some applications, the second path P2 will be shorter than the first. To ensure coincidence at the circuit 250, photons along the shorter path can be delayed optically so signals reach the coincidence circuit 250 at roughly the same time. As a first example, photons along the second path P2 can be delayed optically by adding mirrors and forcing the photons to travel over a longer distance. As a second example, photons along the second path P2 can be delayed optically by inserting an optical element with a refractive index >1 in the second path P2. This will slow the photons transmitted through the element.

In the alternative, the circuit 250 can ensure coincidence. For example, the coincidence counter 250 can measure the time delay between the arrival of the photons of interest by doing a cross correlation measurement between the photons of a certain desired narrow wavelength. There will be a peak (i.e., showing many coincidences) at the appropriate delay time between the two channels.

Figure 3:
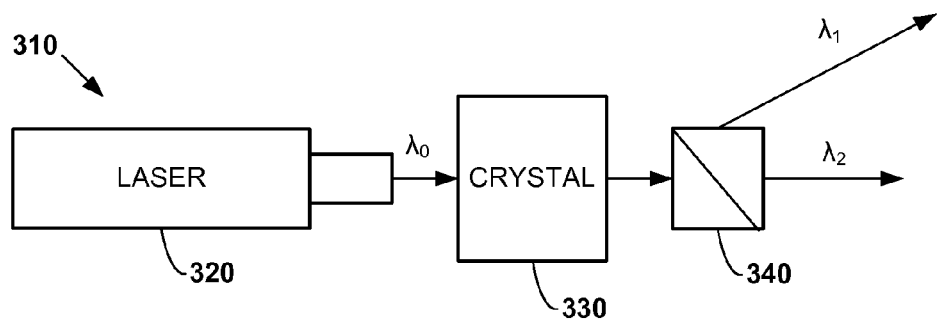
FIG. 3 is an illustration of an exemplary apparatus for generating nondegenerate frequency-entangled photons and sending the photons along separate paths.

FIG. 3 is an illustration of an apparatus 310 for generating frequency-entangled photons and sending those photons down separate paths. A laser 320 at wavelength $\lambda_0$ illuminates a $\chi^{(2)}$ crystal 330 and performs downconversion to generate two photons at $\lambda_1$ and $\lambda_2$. Phase-matching conditions require that $$\frac{1}{\lambda_0} = \frac{1}{\lambda_1} + \frac{1}{\lambda_2}$$

and $$\vec{k}_0 = \vec{k}_1 + \vec{k}_2.$$

The wavelength $\lambda_1$ may be selected for optimum propagation in the obscuration. The specific wavelength is obtained by varying the angle of the crystal 330 relative to the incoming beam. The photons can be generated as either pulsed or continuous wave.

A beam splitter 340 sends the photons at $\lambda_1$ down a first path, and the photons at $\lambda_2$ down the second path. The beam splitter 340 also filters out other wavelengths.

Some embodiments might take advantage of another property of non-classical optical fields by generating entangled photons in a so-called "Squeezed" state. A squeezed state is a state in which the quantum noise is unevenly distributed between the two quadratures of the complex electric field. In such a state, the noise of the amplitude can be made smaller than the standard quantum limit at the expense of the phase noise, or vice versa. This allows the sensitivity of the bucket detector to be increased, since it only detects the presence of photons. Squeezed states may be generated by non-linear optical processes such as four wave mixing. The squeezed state photons are then entangled to the $N^{th}$ degree by an appropriate optical train including N beam splitters or equivalent techniques.

Generation of the frequency-entangled photons is not limited to photons having only two different frequencies. Photons having three, four or more frequencies may be generated and used to illuminate the object, increase imaging resolution, or both.

For example, the so called "N00N States" can be used in the second path P2. A N00N state is the quantum-mechanical entangled state described by the equation:

$$|\psi_{NOON}\rangle = |N\rangle_a|0\rangle_b + e^{i\theta}|0\rangle_a|N\rangle_b,$$

which represents a superposition of N particles in mode a with zero particles in mode b, and vice versa. When using a N00N state of N photons, the resolution is proportional to Lambda/N. where lambda is the photon wavelength. Thus, imaging resolution is better for higher order N00N states. The photons may be generated in an $N^{th}$ order N00N state, where $N \geq 2$.

The imaging of an object with frequency-entangled photons is not limited to any particular use. However, the imaging is particularly advantageous because the wavelength of the photons that penetrate the obscuration can be different than the wavelength of the photons that determine the imaging resolution. This advantage will become apparent in the following three uses: object tracking, surveillance, and nondestructive inspection.

Reference is made to FIG. 4, which illustrates a method of performing object tracking. The hardware illustrated in FIG. 2 may be used to track an object. At block 410, an image of an object is acquired using nondegenerate entangled photons. The first frequency is selected so the photons can pass through airborne obscuration and illuminate the object being tracked. If the object is an aircraft or other airborne object, the first frequency is selected to pass through clouds, fog, and other atmospheric obscurants (e.g., turbulence). For example, a first frequency of 35 or 94 GHz in the millimeter regime may be used.

To track objects at sea, including objects that are under water, the first frequency is selected to penetrate water. Blue-green light may be used, for example at 530 nm or the hydrogen β line at 486 nm.

To track land vehicles, the first frequency is selected so the photons can pass through air, dust, smoke, fog and other atmospheric obscuration.

The second frequency is selected to allow details of the object to be discerned in the acquired image. For example, the second frequency may be in the infrared or visible spectrum.

A telescope, pointing mirror, or other optical assembly may be used to direct the photons having the first frequency toward the object (the optical assembly could be part of the photon generator 220 of FIG. 2, for instance). Whatever is covered in the field of view of the first (e.g., bucket) detector AND in the field of view of the second detector will appear in the acquired image.

At block 420, a processor estimates an expected location for the object being tracked. For example, an object is identified in the acquired image. The object location in the current image is compared to the object location in one or more previously acquired images, and the difference(s) between the locations is used to estimate where the object will be during the next image acquisition. In addition, object recognition may be performed to determine whether the correct object is being tracked (e.g., by comparing the acquired object to a stored reference image).

At block 430, the hardware is adjusted in order to view the object at the expected location. For instance, the telescope, pointing mirror or other optical assembly could be re-oriented to look at the expected location.

The functions in blocks 410, 420 and 430 may be repeated to continue tracking the object.

Contrast the method of FIG. 4 to a method of using a conventional electro-optical/infrared (EO/IR) active imaging systems. Such conventional systems are presented with major limitations by clouds, fog, and other atmospheric obscurants. A conventional system is limited to a wavelength that can penetrate these obscurants and also provide sufficient imaging resolution. Imaging with entangled photons, on the other hand, allows a first optimal frequency to be selected for obscuration, and a second optimal frequency to be selected for imaging resolution.

Figure 5:
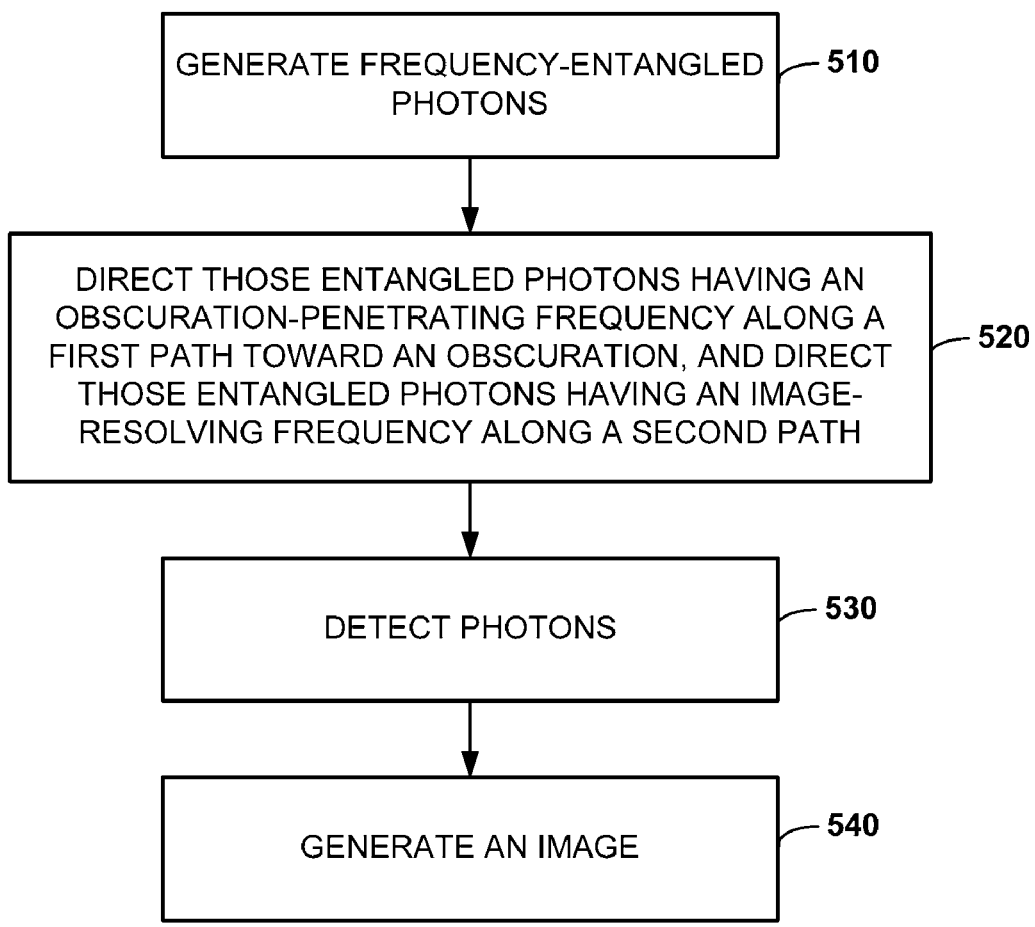
FIG. 5 is an illustration of a method of performing surveillance in accordance with an embodiment of the present invention.

Reference is now made to FIG. 5, which illustrates a method of performing surveillance on an object that is obscured. The hardware illustrated in FIG. 2 may be used to perform the surveillance. At block 510, nondegenerate frequency-entangled photons are generated. At block 520, those photons having a first frequency are directed along a first path toward an obscuration. The frequency of the first beam is selected so the photons pass through the obscuration and illuminate the object or objects behind the obscuration (e.g., walls, windows, and other manmade structures). The frequency can also be selected to anticipate counter-surveillance measures.

Also at block 520, those entangled photons having a second frequency are directed along a second path. The second frequency is selected to provide sufficient image resolution.

At block 530, photons scattered by the obscured object(s) and the photons along the second path are detected. At block 540, an image is generated. The acquired image will reveal details of objects behind the obscuration.

Figure 6:
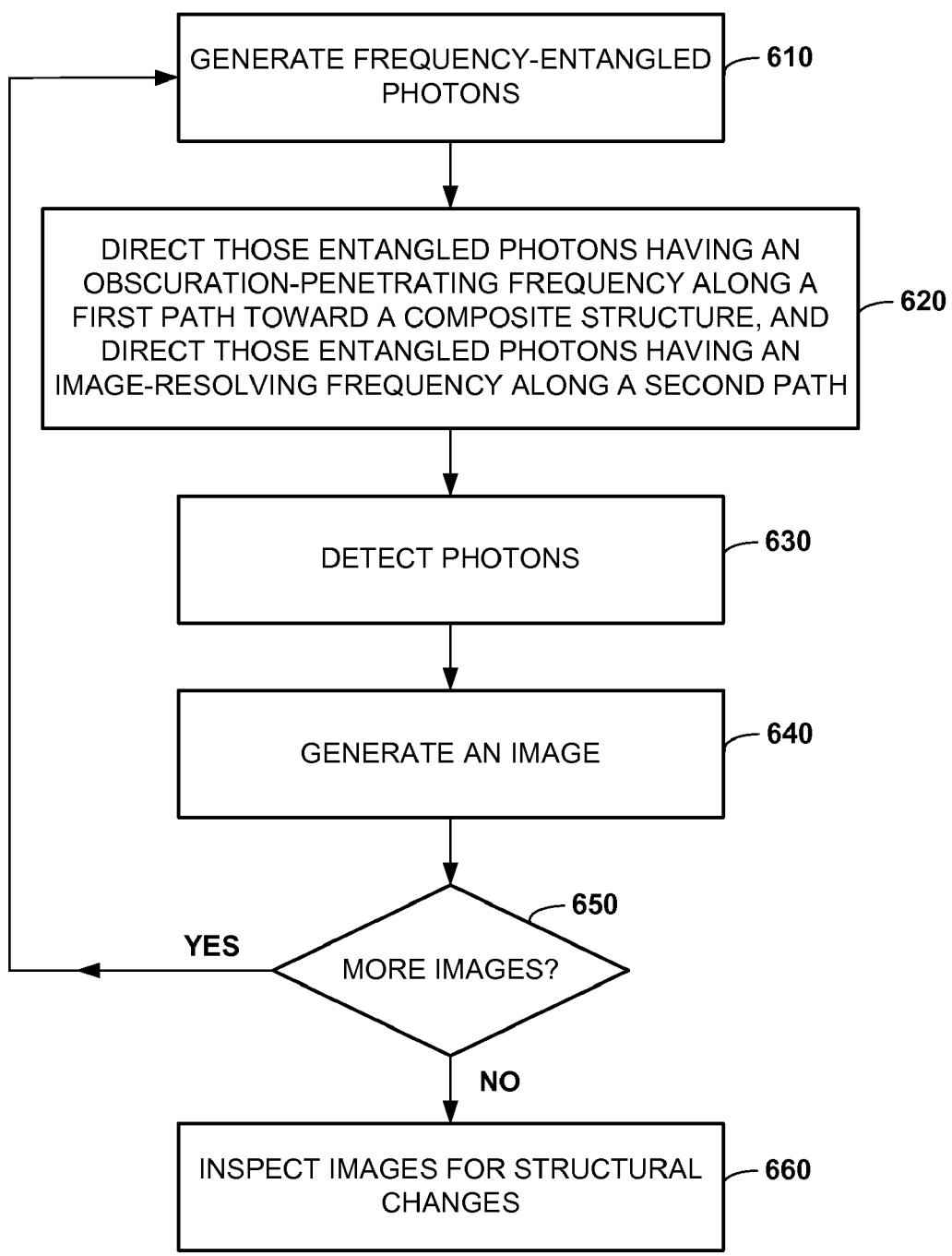
FIG. 6 is an illustration of a method of performing nondestructive inspection in accordance with an embodiment of the present invention.

Reference is made to FIG. 6, which illustrates a method of performing non-destructive inspection (NDI) of structures made of composite material. The hardware illustrated in FIG. 2 may be used to perform the NDI. At block 610, nondegenerate frequency-entangled photons are generated. At block 620, those photons having a first wavelength are directed along a path toward the composite structure. Radio frequency waves may be used.

Also at block 620, those photons having an image-resolving wavelength are directed along a second path. The image-resolving frequency may be in the millimeter spectrum to obtain a higher imaging resolution that allows structural changes (e.g., cracks, corrosion) to be identified.

At block 630, the photons are detected. At block 640, an image is generated.

The functions at blocks 610-640 can be repeated to generate different images of different structures (block 650). Moreover, the focus of those photons having the first wavelength can be adjusted to view structures at different depths. For example, a first focus can be used to view structural changes in a composite panel. Then a second focus can be used to view structural changes in a composite member behind the panel.

At block 660, the images are analyzed to identify structural changes in the structures. Structural changes can scatter or block photons. Depending upon the structural change, a structural change might appear in an image as a brighter patch, or a darker one, or a patch having a different texture.

The method of FIG. 6 may be used to perform NDI on certain aircraft structures (panels, stiffeners, ribs, spars, etc.) that are made of a composite material such as carbon-reinforced plastic (CRFP). For instance, the method can be used to identify cracks, corrosion, and other state changes in aircraft structures.

The invention claimed is:

1. A method of imaging an object, the method comprising:
generating frequency-entangled photons including photons having first and second frequencies, wherein the photons having the first frequency can pass through an obscuration in route to the object;
illuminating the object with the photons having the first frequency; and
using photons scattered by the object and the photons having the second frequency to form an image by considering coincidences in time of arrival.

2. The method of claim 1, wherein the photons having the first frequency are sent down a first path toward the object; wherein the photons scattered by the object are detected by a first detector; and wherein the photons having the second frequency are sent down a second path and are detected by a second detector, the first and second detectors capable of counting individual photons.

3. The method of claim 2, wherein the first detector is a bucket detector; and wherein the bucket detector is operated as a time gate to consider the coincidences.

4. The method of claim 3, wherein the photons are generated in a squeezed state to increase sensitivity of the bucket detector.

5. The method of claim 2, wherein forming the image includes performing a second order correlation of the photons' complex electric fields detected by the first and second detectors.

6. The method of claim 5, wherein performing the second order correlation includes coincidence-measuring the photons detected by the first and second detectors, the coincidence-measuring occurring within a time window that is determined by coherence properties of the frequency-entangled photons.

7. The method of claim 1, wherein the photons having the first frequency do not have sufficient resolution to form an image in which the object can be recognized; wherein the photons having the second frequency have sufficient resolution to form an image in which the object can be recognized; and wherein forming the image includes using the photons having the first frequency to resolve the photons having the second frequency.

8. The method of claim 1, wherein resolution of the image is increased by the photons having the second frequency.

9. The method of claim 8, wherein the second frequency is substantially higher than the first frequency.

10. The method of claim 8, wherein photons having at least one additional frequency are used to increase the resolution of the image.

11. Currently amended The method of claim 8, wherein the photons are generated in an $N^{th}$ order N00N state, where $N \geq 2$.

12. A method of tracking an object, comprising using the method of claim 1 to acquire images containing the object; and estimating locations of the object based on the acquired images.

13. The method of claim 12, wherein the photons having the first wavelength pass through airborne obscuration.

14. A method of performing surveillance, the method comprising forming images of the object using the method of claim 1, wherein the photons having the first frequency are directed toward an obscuration, wherein the photons having the first wavelength pass through the obscuration, and wherein the photons passing though the obscuration are scattered by any objects behind the obscuration.

15. A method of performing nondestructive inspection of an object comprising forming an image of the object using the method of claim 1; and analyzing the image to identify any structural changes.

16. The method of claim 15, wherein the object is an aircraft structure made of composite material; and wherein the first photons are scattered or blocked by structural changes.

17. The method of claim 15, wherein nondestructive inspection is performed on first and second objects, with the second object being behind the first object, and wherein photons having the first frequency have a first focus while inspecting the first object and a second focus while inspecting the second object.

18. An imaging method comprising:
sending non-degenerate frequency-entangled photons down spatially separate paths, where an obscuration lies in a first path, and where the photons sent down the first path have a wavelength that allows transmission through the obscuration; and
using the photons sent down a second path, and photons scattered by an object in the first path, to form an image of the object within a time window, where the photons sent down the second path increase resolution of the image.

19. A system comprising:
means for generating frequency-entangled photons including photons having first and second frequencies;
means for illuminating an object with the photons having the first frequency, where the photons having the first frequency can penetrate an obscuration;
first and second detectors for detecting phase and amplitude of electromagnetic fields formed by those photons scattered by the object and the photons having the second frequency; and
means for performing a second order correlation of the complex electric fields detected by the first and second detectors to form an image.

20. The system of claim 19, further comprising means for ensuring that time coincidences are considered while forming the image.

21. A system comprising
a laser-based system for generating frequency-entangled photons, those photons having a first frequency sent down a first path and those photons having a second frequency sent down a second path, where an obscuration lies in the first path, and where the photons having the first wavelength are transmitted by the obscuration;
a first photon detector for detecting photons scattered by an object in the first path;
a second photon detector for detecting the photons sent down the second path; and
a circuit, responsive to outputs of the detectors, for forming an image of the object within a time window in which the photons detected by the first detector are correlated with the photons detected by the second detector.

22. The system of claim 21, further comprising a processor for estimating an expected location of an object from previously acquired images; and an optical assembly for pointing the first path toward the expected location.

23. The system of claim 21, wherein the system is configured for nondestructive inspection.

* * * * *